United States Patent
Chun

(10) Patent No.: US 7,173,478 B2
(45) Date of Patent: Feb. 6, 2007

(54) VOLTAGE BOOSTER CIRCUIT

(75) Inventor: Jun-Hyun Chun, Ichon-shi (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 6 days.

(21) Appl. No.: 11/174,506

(22) Filed: Jul. 6, 2005

(65) Prior Publication Data
US 2006/0220728 A1 Oct. 5, 2006

(30) Foreign Application Priority Data
Mar. 31, 2005 (KR) ............ 10-2005-0027391

(51) Int. Cl.
G05F 1/10 (2006.01)
(52) U.S. Cl. .................................. 327/536
(58) Field of Classification Search ........... 327/535, 327/536, 537
See application file for complete search history.

(56) References Cited

U.S. PATENT DOCUMENTS

| | | | |
|---|---|---|---|
| 5,635,776 A | 6/1997 | Imi | |
| 6,249,445 B1 * | 6/2001 | Sugasawa | 363/60 |
| 6,466,070 B1 * | 10/2002 | Ross | 327/157 |
| 6,597,235 B2 | 7/2003 | Choi | |
| 6,960,949 B2 * | 11/2005 | Suzuki | 327/157 |

FOREIGN PATENT DOCUMENTS

| | | |
|---|---|---|
| KR | 1995-20723 | 7/1995 |
| KR | 10-1995-0009950 B1 | 7/1996 |
| KR | 1999-006014 | 1/1999 |

* cited by examiner

Primary Examiner—Jeffrey Zweizig
(74) Attorney, Agent, or Firm—McDermott Will & Emery LLP

(57) ABSTRACT

The present invention provides a voltage booster circuit for effectively supplying a boosted voltage of a stable level despite of small area. The voltage booster circuit of the present invention includes: an oscillator for generating a basic pulse signal; a phase divider for dividing a frequency of the basic pulse signal to output a plurality of pulse signals having predetermined phase difference; a first to a fourth charge pumps for outputting a boosted voltage in response to a correspondent pulse signal among the plurality of pulse signals; and a drive controller for controlling the oscillator to maintain the boosted voltage to have a desired level.

9 Claims, 5 Drawing Sheets

VOLTAGE BOOSTER CIRCUIT

FIELD OF INVENTION

The present invention relates to a design technology for a semiconductor device; and, more particularly, to a voltage booster circuit having good pumping drivability as well as small occupation area in a circuit layout.

DESCRIPTION OF PRIOR ART

In general, a voltage booster circuit outputs a boosted voltage higher than an external voltage by charge-pumping of the external voltage.

FIG. 1 is a block diagram setting forth a conventional voltage booster circuit.

Referring to FIG. 1, the conventional voltage booster circuit includes an oscillator 10, a phase divider 20, a plurality of charge pumps 32, 34, 36 and 38, and a drive controller 40. The oscillator 10 generates a first and a second basic pulse signals BS_OSC01 and BS_OSC02, wherein a phase difference between the first and the second basic pulse signals BS_OSC01 and BS_OSC02 is 90°. The phase divider 20 divides the first basic pulse signal BS_OSC01 so as to generate a first pulse signal OSC1 of which a phase is 0° and a third pulse signal OSC3 of which a phase is 180° with respect to the first basic pulse signal BS_OSC01. In addition, the phase divider 20 generates a second pulse signal OSC2 of which a phase is 0° and a fourth pulse signal OSC4 of which a phase is 180° with respect to the second basic pulse signal BS_OSC02 by dividing the second basic pulse signal BS_OSC02. The plurality of charge pumps are provided with a first to a fourth charge pumps 32, 34, 36 and 38 that generate a boosted voltage Vpp by charge-pumping of an external voltage in response to the first to the fourth pulse signals OSC1 to OSC4. The drive controller 40 controls the oscillator 10 to make the boosted voltage Vpp have a desired level.

FIG. 2 is a circuit diagram setting forth the oscillator 10 of the conventional voltage booster circuit.

Referring to FIG. 2, the oscillator 10 is provided with a NAND gate ND1, a first inverter I1, a first inverter chain 12, a second inverter I2 and a second inverter chain 14. Herein, the NAND gate ND1 performs logic NAND operation to a drive control signal EN and an output signal of the second inverter chain 14. The first inverter I1 inverts the output signal of the NAND gate ND1 so as to output the first basic pulse signal BS_OSC01 The first inverter chain 12 delays and outputs the output signal of the NAND gate ND1. The second inverter I2 inverts the output signal of the first inverter chain 12 so as to output the second basic pulse signal BS_OSC02. The second inverter chain 14 delays and outputs the output signal of the first inverter chain 12.

For reference, each of the first and the second inverter chains 12 and 14 incorporates therein four inverters connected in series so that each inverter chain 12 and 14 has same delay time.

Likewise, the oscillator 10 maintains to make the first basic pulse signal BS_OSC01 and the second basic pulse signal BS_OSC_02 have logic low level respectively in virtue of the NAND gate ND1, while the drive control signal EN is in logic low level.

In case that the drive control signal EN becomes in logic high level, the NAND gate ND1 in the oscillator 10 outputs the first basic pulse signal BS_OSC01 of logic high level. In this case, the second basic pulse signal BS_OSC_02 of logic high level is outputted through the second inverter I2 after being delayed by a predetermined delay time at the first inverter chain 12. That is, the second basic pulse signal BS_OSC02 becomes in logic high level soon after an additional delay corresponding to the predetermined delay time of the first inverter chain 12. At this time, since the first and the second inverter chains 12 and 14 have same delay time as described already, the second basic pulse signal BS_OSC_02 has phase difference of 90° with respect to the first basic pulse signal BS_OSC01.

Therefore, the oscillator 10 continuously generates the first and the second basic pulse signals BS_OSC01 and BS_OSC02 of which periods are four times longer than the predetermined delay time of the first inverter chain 12, while the drive control signal EN is in logic high level.

FIG. 3 is a circuit diagram setting forth a phase divider 20 of the conventional voltage booster circuit as shown in FIG. 1.

Referring to FIG. 3, the phase divider 20 is provided with a third inverter I3 for outputting the third pulse signal OSC3 by inverting the first basic pulse signal BS_OSC01, a fourth inverter I4 for outputting the first pulse signal OSC1 by inverting the third pulse signal OSC3, a fifth inverter I5 for outputting the fourth pulse signal OSC4 by inverting the second basic pulse signal BS_OSC02 and a sixth inverter I6 for outputting the second pulse signal OSC2 by inverting the fourth pulse signal OSC4.

As the first and the second basic pulse signal BS_OSC01 and BS_OSC02 are inverted through the third inverter I3 and the fifth inverter I5 respectively, the phase divider 20 generates the third pulse signal OSC3 that has phase difference of 180° with respect to the first basic pulse signal BS_OSC01, and the fourth pulse signal OSC4 that has phase difference of 180° with respect to the second basic pulse signal BS_OSC02.

In addition, since the third and the fourth pulse signals OSC3 and OSC4 are inverted through the fourth and the sixth inverters I4 and I6 respectively, the first and the second pulse signals OSC1 and OSC2 have phase difference of 0° with respect to the first and the second basic pulse signals BS_OSC01 and BS_OSC02 respectively.

For reference, each of the first to the fourth pulse signals OSC1 to OSC4 has a period in tens of nanometers generally.

FIG. 4 is a timing diagram setting forth an operation of the conventional voltage booster circuit.

To begin with, the oscillator 10 maintains the first and the second basic pulse signals BS_OSC01 and BS_OSC02 to be in logic low level while the drive control signal EN is in logic low level. Therefore, the first to the fourth pulse signals OSC1 to OSC4 outputted from the phase divider 20 do not have pulse so that the first to the fourth charge pumps 32, 34, 36 and 38 are not operated.

However, when the drive control signal EN becomes in logic high level, the oscillator 10 generates the first and the second basic pulse signals BS_OSC01 and BS_OSC02 having periods of four times longer than the predetermined delay time of the first inverter chain 12. At this time, the second basic pulse signal BS_OSC02 has phase difference of 90° with respect to the first basic pulse signal BS_OSC02.

Thereafter, the phase divider 20 receives the first and the second basic pulse signals BS_O0SC01 and BS_OSC02 so as to generate the first to the fourth pulse signals having a phase difference of 0° or 180° with respect to the first and the second basic pulse signal BS_OSC01 and BS_OSC02. Thus, the first to the fourth charge pumps 32, 34, 36 and 38, are enabled during an activation period of a correspondent pulse signal so as to generate the boosted voltage Vpp by pumping the applied external voltage Vext.

Afterwards, the drive controller 40 outputs the drive control signal EN of logic high level on and on if the boosted voltage Vpp does not have a desired level. Accordingly, the drive controller 40 makes the charge pumps 32, 34, 36 and 38 operated continuously because the first and the second basic pulse signals BS_OSC01 and BS_OSC02 are continuously generated while the drive control signal EN is in logic high level. Provided that the level of the boosted voltage Vpp reaches to the desired level, the drive controller 40 outputs the drive control signal EN of logic low level. Therefore, the oscillator 10 stops being operated so as to deactivate the charge pumps 32, 34, 36 and 38.

Meanwhile, the conventional voltage booster circuit shows poor drivability efficiency because it is difficult to maintain the pulse signal to have duty ratio of 50% and further, it is also difficult to generate a plurality of pulse signals having same phase difference from one another.

In detail, the pulse signals OSC1 to OSC4 cannot maintain duty ratio of 50% because duty ratio of the basic pulse signals BS_OSC01 and BS_OSC02 for generating the pulse signals OSC1 to OSC 4 are varied with PVT variance. In other words, the pulse signals OSC1 to OSC4 are obtained from two basic pulse signals, i.e., the basic pulse signals BS_OSC01 and BS_OSC02, whereby the pulse signals OSC1 to OSC4 have same duty ratio with those of the basic pulse signals BS_OSC01 and BS_OSC02. However, since the basic pulse signals BS_OSC01 and BS_OSC02 are generated at the oscillator 10 incorporating therein the inverter chain which is severely influenced by a level of a drive voltage, temperature of a peripheral region, a process condition and so forth, it is difficult to maintain duty ratio of 50% uniformly.

Furthermore, in order to maximize the drivability efficiency, each charge pump should be operated at its own predetermined time within one period. However, according to the conventional voltage booster circuit, it is difficult to generate the plurality of pulse signals having same phase difference from one another.

As described above, since the pulse signals are obtained from two basic pulse signals after being delayed and inverted, phase difference between the basic pulse signals should be controlled in considering the phase difference between the pulse signals corresponding to the number of the charge pump. However, it is difficult to generate the basic pulse signals and the pulse signals in considering the adequate phase difference therebetween corresponding to the number of the charge pump. Moreover, the phase difference between the pulse signals, which are generated from two basic pulse signals, is scarcely uniform.

In addition, it should be necessary to increase a required area in a circuit layout in order to supply the boosted voltage Vpp of a stable level according to the conventional voltage booster circuit. That is, since a driving time of the charge pumps 32, 34, 36 and 38 should be elongated for providing the boosted voltage Vpp of stable level, each period of the first to the fourth pulse signals OSC1 to OSC4 should be elongated. Therefore, it is also necessary to elongate the first and the second basic pulse signals BS_OSC01 and BS_OSC02 for generating the elongated first to the fourth pulse signals OSC1 to OSC4. As a result, the number of the inverter in the oscillator 10 should be increased, which causes to increase a required area in the circuit layout in the long run.

SUMMARY OF INVENTION

It is, therefore, an object of the present invention to provide a voltage booster circuit for effectively supplying a boosted voltage of stable level despite of a small occupation area in a circuit layout.

In accordance with an aspect of the present invention, there is provided a voltage booster circuit including: an oscillator for generating a basic pulse signal; a phase divider for dividing a frequency of the basic pulse signal to output a plurality of pulse signals having predetermined phase difference; a first to a fourth charge pumps for outputting a boosted voltage in response to a correspondent pulse signal among the plurality of pulse signals; and a drive controller for controlling the oscillator to maintain the boosted voltage to have a desired level.

In accordance with another aspect of the present invention, there is provided a voltage booster circuit including: an oscillator for generating a basic pulse signal; a phase divider for generating a pulse signal by dividing a frequency of the basic pulse signal; a charge pump for outputting a boosted voltage in response to the pulse signal; and a drive controller for controlling the oscillator to maintain the boosted voltage to have a desired level.

BRIEF DESCRIPTION OF THE DRAWINGS

The above and other objects and features of the present invention will become apparent from the following description of preferred. embodiments taken in conjunction with the accompanying drawings, in which.

DETAILED DESCRIPTION OF INVENTION

The present invention will now be described more fully with reference to the accompanying drawings, in which exemplary embodiments of the invention are shown.

Figure 5:
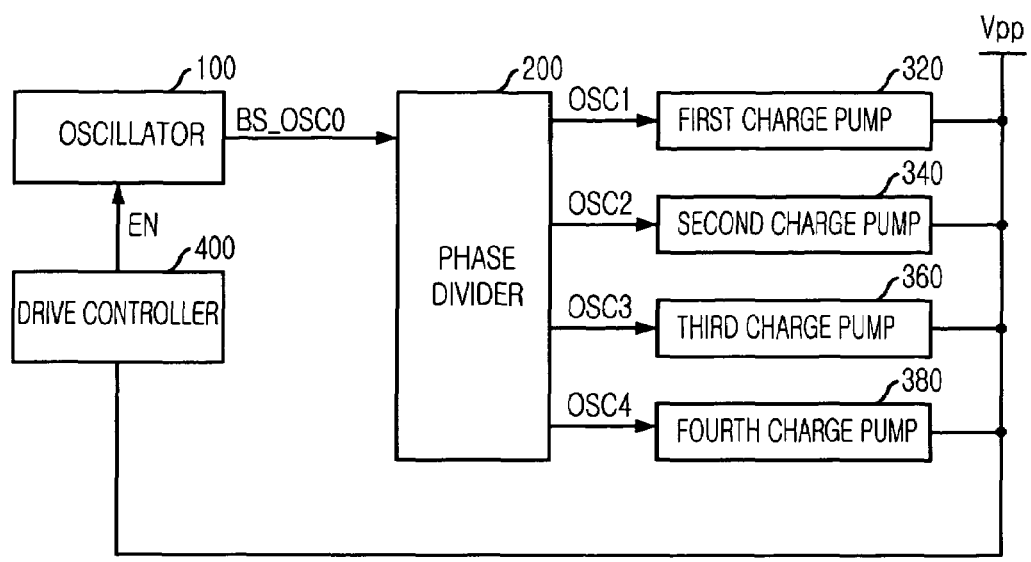
FIG. 5 is a block diagram depicting a voltage booster circuit in accordance with a preferred embodiment of the present invention.

FIG. 5 is a block diagram setting forth a voltage booster circuit in accordance with a preferred embodiment of the present invention.

Referring to FIG. 5, the inventive voltage booster circuit includes an oscillator 100, a phase divider 200, a first to a fourth charge pumps 320, 340, 360 and 380, and a drive controller 400. Herein, the oscillator 100 generates a basic pulse signal BS_OSC0. The phase divider 200 divides frequency of the basic pulse signal BS_OSC0 so as to output a first to a fourth pulse signals OSC1 to OSC4 having each phase difference of 90° therebetween. The first to the fourth charge pumps 320, 340, 360 and 380 output a boosted voltage Vpp in response to the first to the fourth pulse signals OSC1 to OSC4 respectively. The drive controller 400 controls operation of the oscillator 100 in order to maintain the outputted boosted voltage Vpp to have a desired level.

In accordance with the present invention, since the pulse signals OSC1 to OSC4 for driving the charge pumps 320, 340, 360 and 380 are generated through the phase divider 200 incorporating therein frequency dividers, it is sufficient for the oscillator 100 to generate only one basic pulse signal BS_OSC0. This will be more fully described with reference to following drawings.

Figure 6:
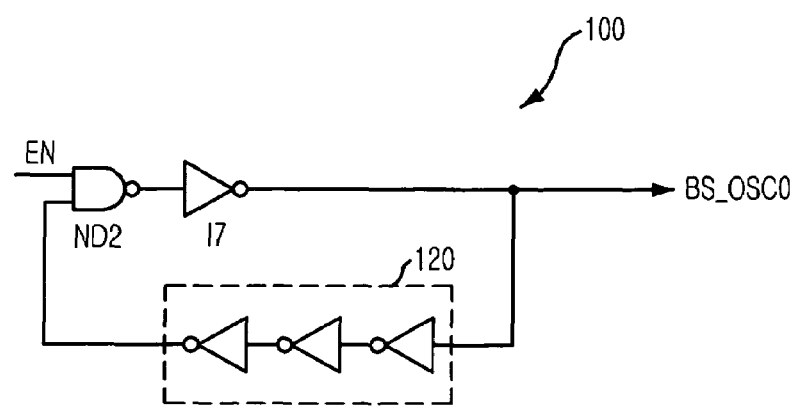
FIG. 6 is a circuit diagram showing the oscillator of the voltage booster circuit in accordance with the present invention.

FIG. 6 is a circuit diagram setting forth the oscillator 100 of the voltage booster circuit in accordance with the present invention.

Referring to FIG. 6, the oscillator 100 is provided with a NAND gate ND2, an inverter I7 and an inverter chain 120. Herein, the NAND gate ND2 receives a drive control signal EN and a feedback signal as input signals. The inverter I7 inverts the output signal of the NAND gate ND2 so as to output the basic pulse signal BS_OSC0. The inverter chain 120 outputs the feedback signal after delaying and inverting the basic pulse signal BS_OSC0.

Figure 1:
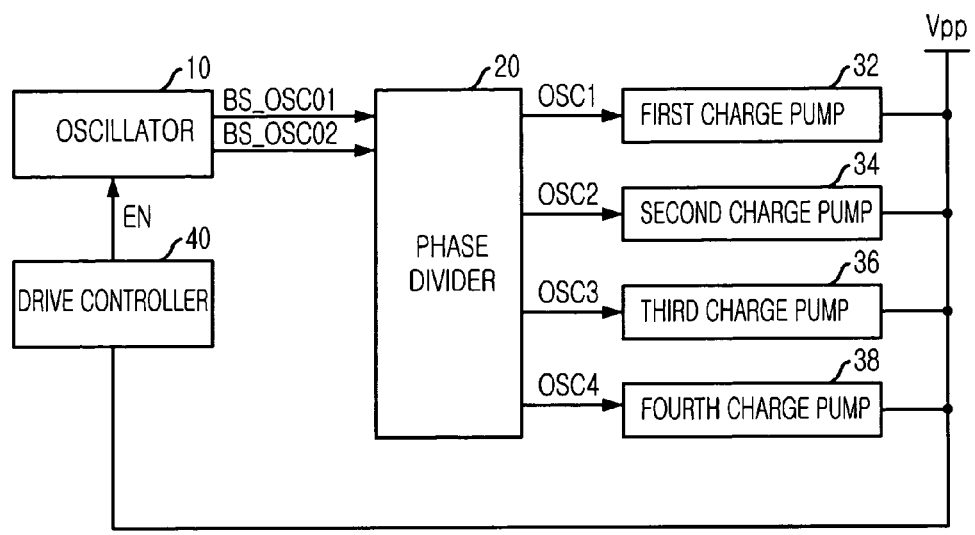
FIG. 1 is a block diagram setting forth a conventional voltage booster circuit.
Figure 2:
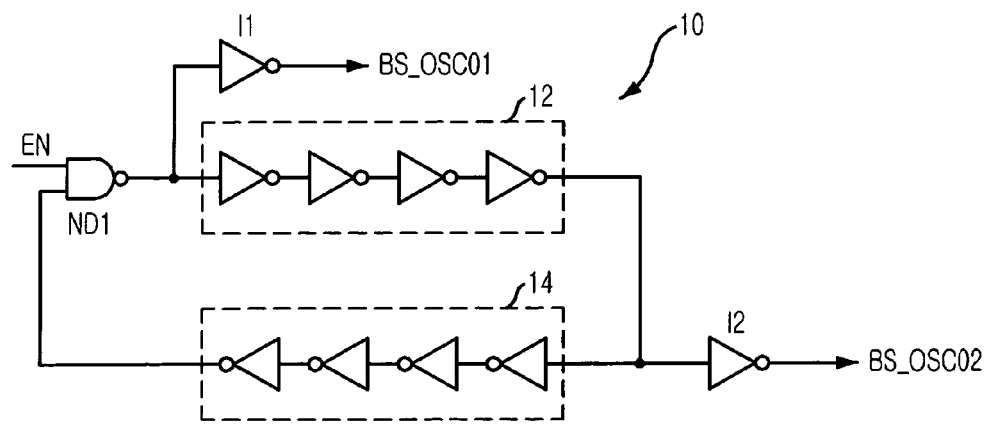
FIG. 2 is a circuit diagram representing the oscillator of the conventional voltage booster circuit.
Figure 3:
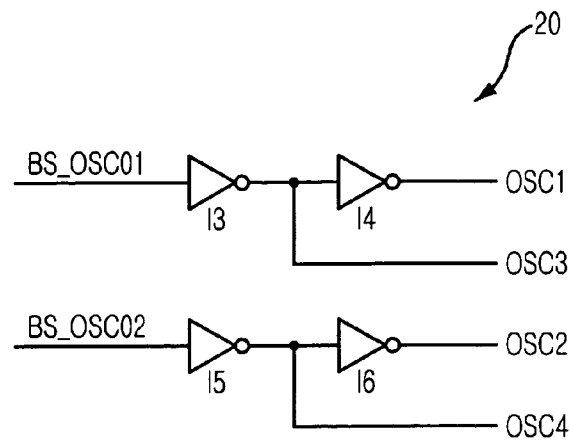
FIG. 3 is a circuit diagram describing a phase divider of the conventional voltage booster circuit.
Figure 4:
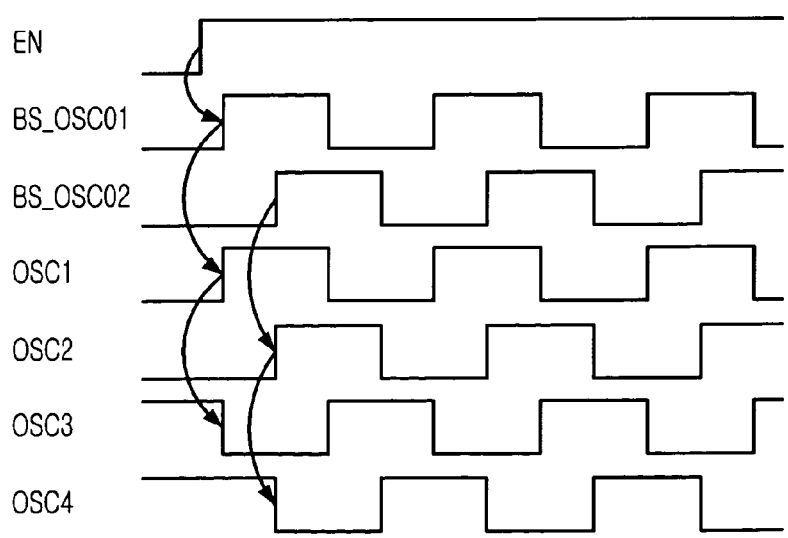
FIG. 4 is a timing diagram explaining an operation of the conventional voltage booster circuit.

In comparison of the inventive oscillator 100 with the conventional one which is shown in FIG. 2, the inventive oscillator 100 has inverters less than the conventional one. Thus, it is understood that the basic pulse signal BS_OSC0 has relatively short period. Accordingly, a required area for the oscillator 100 becomes smaller than the conventional oscillator.

Figure 7:
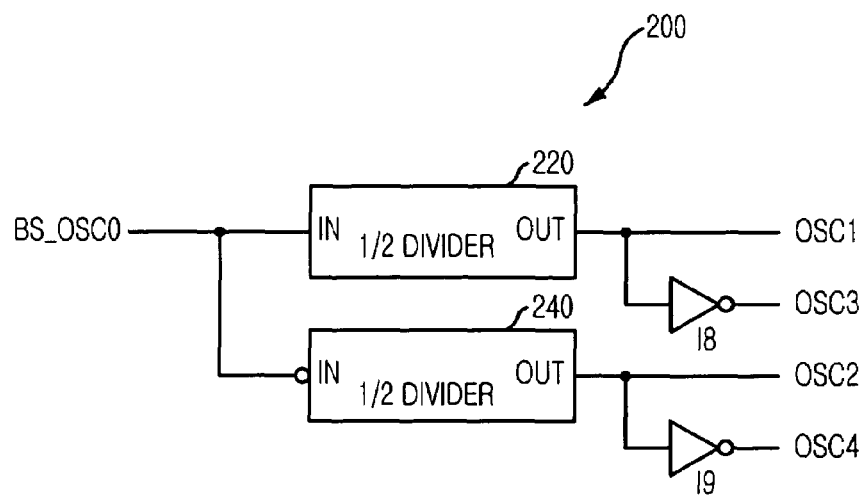
FIG. 7 is a circuit diagram illustrating the phase divider of the voltage booster circuit in accordance with the present invention.

FIG. 7 is a circuit diagram setting forth the phase divider 200 of the voltage booster circuit in accordance with the present invention.

Referring to FIG. 7, the phase divider 200 is provided with a first divider 220, an inverter I8, a second divider 240, an inverter I9. The first divider 220 divides a frequency of the basic pulse signal BS_OSC0 by two so as to output a first pulse signal OSC1. The inverter I8 inverts the first pulse signal OSC1 and then outputs a third pulse signal OSC3. The second divider 240 divides a frequency of an inverted basic pulse signal by two so as to output a second pulse signal OSC2. The inverter I9 inverts the second pulse signal OSC2 to thereby output a fourth pulse signal OSC4.

In accordance with the inventive phase divider 200, since the basic pulse signal BS_OSC0 is divided through the first and the second dividers 220 and 240, it is possible to generate the first to the fourth pulse signals OSC1 to OSC4 having accurate duty ratio of 50%. In addition, since the first to the fourth pulse signals OSC1 to OSC4 are generated from only one basic pulse signal BS_OSC0, the phase difference between the pulse signals is exactly 90°, which is different from the conventional one.

Furthermore, the phase divider 200 divides the frequency of the basic pulse signal BS_OSC0 by a desired period through the first and the second dividers 220 and 240, it is unnecessary for the basic pulse signal BS_OSC0 to have a specific period so that it is possible to reduce the occupation area of the oscillator 100.

Figure 8:
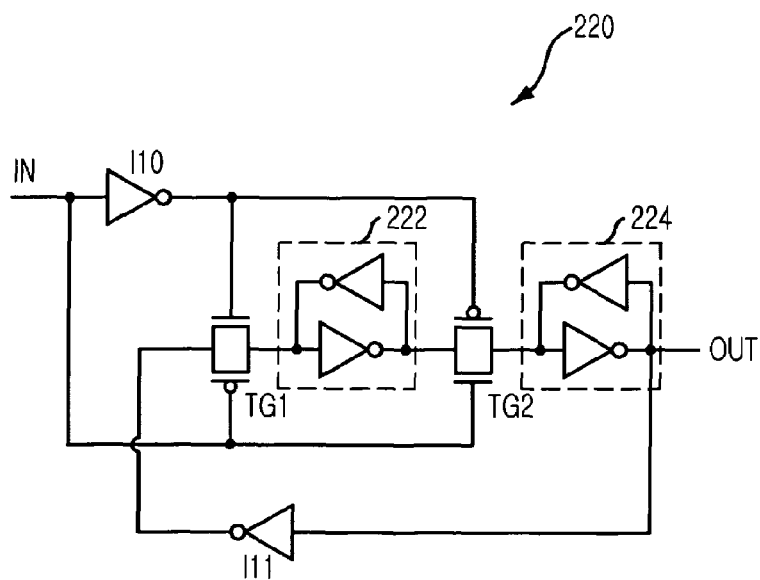
FIG. 8 is a circuit diagram indicating the first frequency divider of the phase divider in accordance with the present invention.

FIG. 8 is a circuit diagram setting forth the first divider 220 of the phase divider 200 in accordance with the present invention. Herein, since the second divider 240 also has same configuration with the first divider 220, detail descriptions are mainly focused on the first divider 220.

Referring to FIG. 8, the first divider 220 has a first transfer gate TG1, a first latch 222, a second transfer gate TG2 and a second latch 224. The first transfer gate TG1 transfers an inverted output signal thereof when an input signal IN is in logic low level. The first latch 222 is used for latching the output signal of the first transfer gate TG1. The second transfer gate TG2 transfers the output signal of the first latch 222 when the input signal IN is in logic high level. The second latch 224 latches the output signal of the transfer gate TG2 so as to output an output signal OUT.

Each divider 220 and 240 is configured with the first and the second transfer gates TG1 and TG2 which transfer data according to a logic level of the input signal IN. The first and the second dividers 220 and 240 render the level of the output signal OUT be changed once during one period of the input signal IN. As a result, the output signal OUT of each divider 220 and 240 has a period two times longer than the period of the input signal IN.

Meanwhile, since the first and the second dividers 220 and 240 receive the basic pulse signal BS_OSC0 as the input signal IN, it is understood that the period of the output signal OUT is also two times longer than that of the basic pulse signal BS_OSC0.

Figure 9:
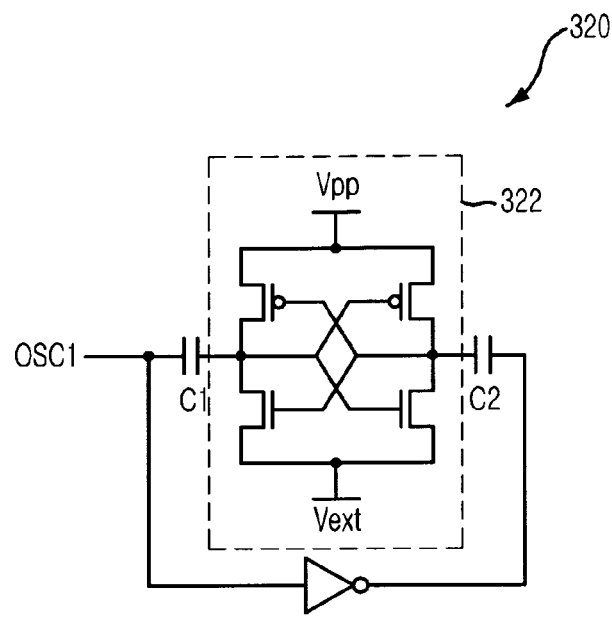
FIG. 9 is a circuit diagram expressing the first charge pump of the voltage booster circuit in accordance with the present invention.

FIG. 9 is a circuit diagram setting forth the first charge pump 320 of the voltage booster circuit in accordance with the present invention. Herein, each of the charge pumps 320, 340, 360 and 380 has same configuration so that descriptions will be restricted to the first charge pump 320 for the sake of convenience.

The first charge pump 320 is provided with a first capacitor C1 for receiving the first pulse signal OSC1, a second capacitor C2 for receiving an inverted first pulse signal and a differential amplifier 322 where charges stored at the first and the second capacitors C1 and C2 are applied as a differential input.

Figure 10:
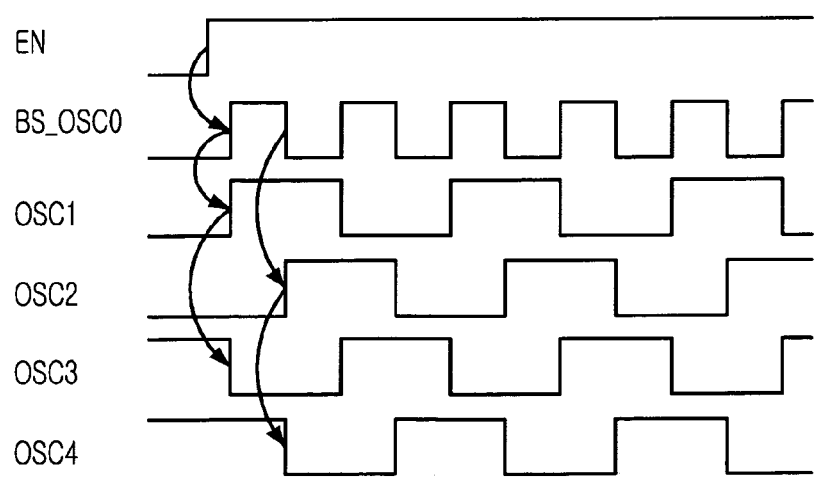
FIG. 10 is a timing diagram accounting for an operation of the voltage booster circuit in accordance with the preferred embodiment of the present invention.

FIG. 10 is a timing diagram setting forth an operation of the voltage booster circuit in accordance with the preferred embodiment of the present invention.

To begin with, in case that the drive control signal EN is in logic low level, the oscillator 100 outputs the basic pulse signal BS_OSC0 of logic low level. On the other hand, if the drive control signal EN becomes in logic high level, the oscillator 100 outputs the basic pulse signal BS_OSC0 of which the period is two times longer than the delay time of its inverter chain 120.

Thereafter, the phase divider 200 divides the frequency of the basic pulse signal BS_OSC0 by two, which is applied through the first and the second dividers 220 and 240. Therefore, the phase divider 200 outputs the first to the fourth pulse signals OSC1 to OSC4 in which the phase difference between the Nth pulse signal and the N+1th pulse signal is 90°. That is, the phase difference between the first and the second pulse signals OSC1 and OSC2 is 90° and so forth.

Accordingly, the first to the fourth charge pumps 320, 340, 360 and 380 generates the boosted voltage Vpp according to the logic level of the correspondent pulse signal.

In addition, the drive controller 400 maintains the drive control signal EN to be in logic high level provided that the boosted voltage Vpp does not reach to a desired level, whereby the oscillator 100 continuously generates the basic pulse signal BS_OSC0. Meanwhile, if the level of the boosted voltage Vpp becomes the desired level, the drive controller 400 maintains the drive control signal EN to be in logic low level so that the oscillator 100 is turned off and the charge pumps 320, 340, 360 and 380 are disabled.

Likewise, in accordance with the voltage booster circuit of the present invention, since the phase divider 200 incorporates therein frequency dividers, i.e., the first and the second dividers 220 and 240, it is possible to control the period of the pulse signal through the frequency dividers 220 and 240 regardless of whether the basic pulse signal BS_OSC0 has a specific period required for the charge pumps 320, 340, 360 and 380 or not. Therefore, the basic pulse signal BS_OSC0 may have short period so that the required area of the oscillator 100 in the circuit layout can be reduced in comparison with the prior art.

Furthermore, since the phase divider 200 is provided with the frequency dividers, the pulse signals OSC1 to OSC4 outputted from the first and the second dividers 220 and 240 have duty ratio of 50%. In addition, since the pulse signals are generated from only one basic pulse signal BS_OSC0, the phase difference between the pulse signals can be uniform.

Accordingly, the voltage booster circuit of the present invention having the divider can be implemented within only small area in comparison with the prior art. Moreover, the present invention provides another advantageous merit that it is possible to control the phase difference between the pulse signals and duty ratio in order that the inventive voltage booster circuit may have optimized drivability.

Meanwhile, since the boosted voltage Vpp is generated through four charge pumps 320, 340, 360 and 380, it is possible to generate the first to the fourth pulse signals in which the phase difference is exactly 90° from one another, for maintaining uniform intervals thereamong. Herein, in case that the number of the charge pump is varied unlike the embodiment of the present invention, the phase difference between the pulse signals may be also varied so that the number of the divider and division ratio may be varied with various conditions.

The present application contains subject matter related to Korean patent application No. 2005-27391, filed in the Korean Patent Office on Mar. 31, 2005, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A voltage booster circuit comprising:
   an oscillation means for generating a basic pulse signal;
   a phase division means for dividing a frequency of the basic pulse signal to output a plurality of pulse signals having predetermined phase difference;
   a first to a fourth charge pumping means for outputting a boosted voltage in response to a correspondent pulse signal among the plurality of pulse signals; and
   a drive control means for controlling the oscillation means to maintain the boosted voltage to have a desired level.

2. The voltage booster circuit as recited in claim 1, wherein the phase division means includes:
   a first divider for outputting a first pulse signal by dividing the frequency of the basic pulse signal by 2;
   a first inverter for outputting a third pulse signal by inverting the first pulse signal;
   a second divider for outputting a second pulse signal by dividing the frequency of the basic pulse signal by 2; and
   a second inverter for outputting a fourth pulse signal by inverting the second pulse signal.

3. The voltage booster circuit as recited in claim 2, wherein the each of the first and the second dividers includes:
   a first transfer gate for transferring an inverted output signal thereof when the input signal is in logic low level;
   a first latch for latching the output signal of the first transfer gate;
   a second transfer gate for transferring the output signal of the first latch when the input signal is in logic high level; and
   a second latch for latching the output signal of the second transfer gate.

4. The voltage booster circuit as recited in claim 3, wherein the oscillation means includes:
   a NAND gate for performing a logic NAND operation to a drive control signal of the drive control means and a feedback signal;
   a third inverter for outputting the basic pulse signal by inverting the output signal of the NAND gate; and
   an inverter chain for outputting the feedback signal by delaying and inverting the basic pulse signal.

5. The voltage booster circuit as recited in claim 4, wherein each charge pump includes:
   a first capacitor which a correspondent pulse signal is applied to;
   a second capacitor which an inverted correspondent pulse signal is applied to; and
   a differential amplifier where charges stored at the first and the second capacitors are applied as a differential input.

6. A voltage booster circuit comprising:
   an oscillation means for generating a basic pulse signal;
   a phase division means for generating a pulse signal by dividing a frequency of the basic pulse signal;
   a charge pumping means for outputting a boosted voltage in response to the pulse signal; and
   a drive control means for controlling the oscillation means to maintain the boosted voltage to have a desired level.

7. The voltage booster circuit as recited in claim 6, wherein the phase division means is provided with M number of dividers for generating M number of pulse signals by dividing the frequency of the basic pulse signal by N number.

8. The voltage booster circuit as recited in claim 7, wherein said M number of pulse signals generated by said M number of dividers have same phase difference from one another.

9. The voltage booster circuit as recited in claim 8, wherein the charge pumping means is provided with M number of charge pumps for receiving said M number of pulse signals respectively, each charge pump being operated at its respective time.

* * * * *